(12) United States Patent
Cmielowski et al.

(10) Patent No.: US 12,216,738 B2
(45) Date of Patent: Feb. 4, 2025

(54) PREDICTING PERFORMANCE OF MACHINE LEARNING MODELS

(71) Applicant: International Business Machines Corporation, Armonk, NY (US)

(72) Inventors: Lukasz G. Cmielowski, Cracow (PL); Rafal Bigaj, Cracow (PL); Wojciech Sobala, Cracow (PL); Maksymilian Erazmus, Zasów (PL)

(73) Assignee: International Business Machines Corporation, Armonk, NY (US)

( * ) Notice: Subject to any disclaimer, the term of this patent is extended or adjusted under 35 U.S.C. 154(b) by 1151 days.

(21) Appl. No.: 17/068,226

(22) Filed: Oct. 12, 2020

(65) Prior Publication Data

US 2022/0114401 A1  Apr. 14, 2022

(51) Int. Cl.
 *G06F 18/21* (2023.01)
 *G06F 18/214* (2023.01)
 *G06N 20/00* (2019.01)
 *G06Q 10/0639* (2023.01)

(52) U.S. Cl.
 CPC ........ *G06F 18/2185* (2023.01); *G06F 18/214* (2023.01); *G06N 20/00* (2019.01); *G06Q 10/06393* (2013.01)

(58) Field of Classification Search
 CPC ... G06F 18/214; G06F 18/2185; G06N 20/00; G06N 3/08; G06Q 10/06393
 See application file for complete search history.

(56) References Cited

U.S. PATENT DOCUMENTS

| | | |
|---|---|---|
| 9,208,463 B1 | 12/2015 | Bhide et al. |
| 2008/0215400 A1 | 9/2008 | Ban et al. |
| 2009/0281845 A1 | 11/2009 | Fukuda et al. |
| 2015/0379429 A1 | 12/2015 | Lee et al. |
| 2021/0019652 A1* | 1/2021 | Gadelrab ............ G06F 11/3466 |
| 2021/0034980 A1* | 2/2021 | Xia .......................... G06N 3/08 |
| 2023/0336340 A1* | 10/2023 | Polleri .................... G06F 18/10 |

* cited by examiner

*Primary Examiner* — Brent Johnston Hoover
(74) *Attorney, Agent, or Firm* — Yee & Associates, P.C.

(57) ABSTRACT

A computer-implemented method and computer program product for predicting an impact of an adjustment to a machine learning model to key performance indicators, and a forecasting engine. The computer-implemented method may comprise receiving a proposed adjustment to a machine learning model, calculating, using a regression machine learning model to ingest the proposed adjustment, a set of value components for a key performance indicator (KPI), calculating a plurality of results for the KPI using the set of value components, automatically determining whether the plurality of results exceeds a performance threshold, and recommending the proposed adjustment based on the determination.

13 Claims, 7 Drawing Sheets

PREDICTING PERFORMANCE OF MACHINE LEARNING MODELS

BACKGROUND

The present disclosure relates to predicting the performance of machine learning (ML) models, and more specifically, to a system for predicting the performance of a new ML model on a key performance indicator (KPI) before pushing the new ML model to production.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

One technology that has evolved to take advantage of this new capability is machine learning (ML) models. Machine learning generally refers to class of systems that can generalize data into a model, and then apply that model to make predictions, rather than through explicit programming. ML models have been used extensively over the last decade in applications ranging from recommendation systems to computer vision to natural language processing. Many of the recent successful recognition systems are built on top of this class of architecture.

SUMMARY

According to embodiments of the present disclosure, a computer-implemented method for predicting an impact of an adjustment to a machine learning model to key performance indicators. The method may comprise receiving a proposed adjustment to a machine learning model, calculating, using a regression machine learning model to ingest the proposed adjustment, a set of value components for a key performance indicator (KPI), calculating a plurality of results for the KPI using the set of value components, automatically determining whether the plurality of results exceeds a performance threshold, and recommending the proposed adjustment based on the determination.

According to embodiments of the present disclosure, a computer program product for predicting an impact of an adjustment to a machine learning model to key performance indicators. The computer program product may comprise a computer readable storage medium having program instructions embodied therewith. The program instructions may be executable by a processor to cause the processor to receive a proposed new version of a machine learning model, calculate, using a regression machine learning model to ingest the proposed new version, a set of value components for a plurality of key performance indicators, calculate a plurality of results for the plurality of key performance indicators, using the set of value components, and automatically determine whether the plurality of results exceeds a performance threshold.

According to embodiments of the present disclosure, a forecasting engine for a machine learning model. The forecasting engine may comprise one or more processors coupled to one or more memories. The one or more memories may comprise an original machine learning model having performance statistics associated therewith, performance data for the original machine learning model, and program instructions. The program instructions may, when executed on the one or more processors, cause the one or more processors to receive a proposed adjustment to the original machine learning model, calculate, using a regression machine learning model to ingest the proposed adjustment, a set of value components for a plurality of key performance indicators, calculate a plurality of results for the plurality of key performance indicators, using the set of value components, and automatically determine whether the plurality of results exceeds the performance data for the original machine learning model.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
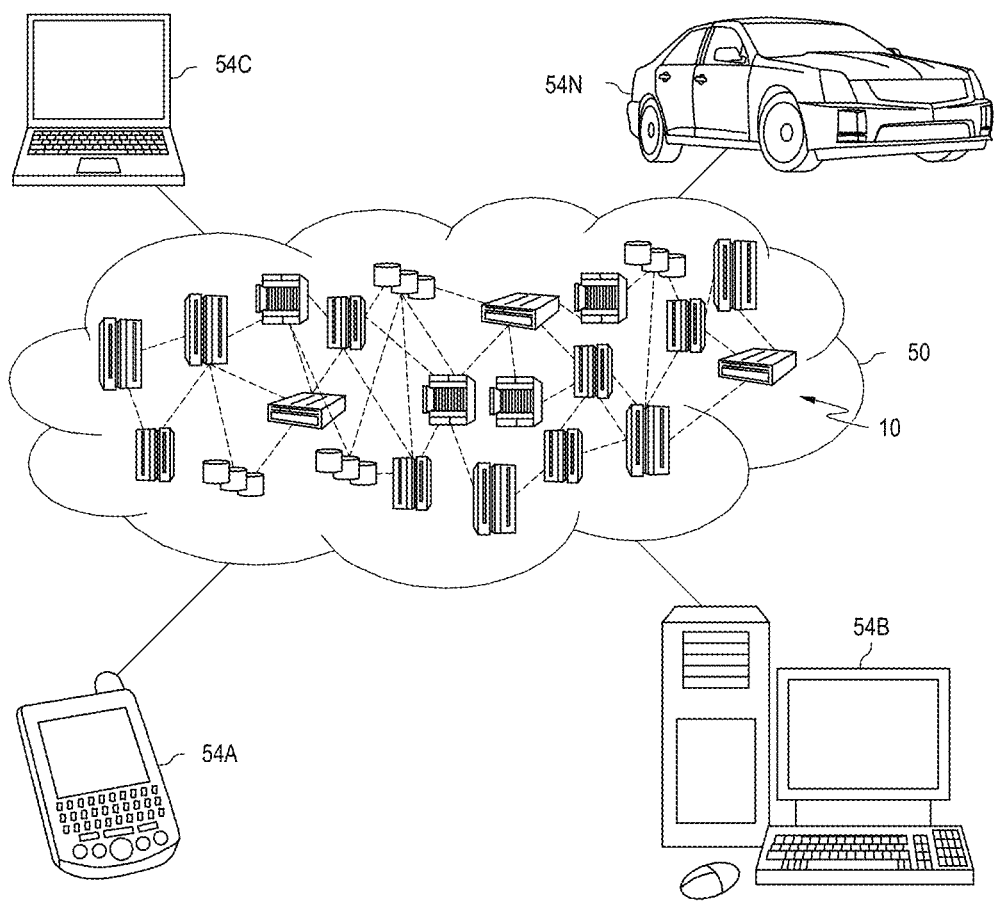
FIG. 1 depicts a cloud computing environment, consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to predicting the performance of machine learning (ML) models; more particular aspects relate to predicting the performance of a new ML model on a key performance indicator (KPI) before pushing the new ML model to production. While the present disclosure is not necessarily limited to such applications, various aspects of the disclosure may be appreciated through a discussion of various examples using this context.

Today, a large number of business applications rely on ML models. These applications include providing better product recommendations to customers based on their preferences and purchase history, providing suggestions to customers of television series or movies they may like, image classification, speech recognition, natural language understanding, natural language generation, and so on.

An ML model, in turn, generally refers to the output generated by a machine-learning algorithm after it is trained on a data set. After training, when the ML model is provided with an input, the ML model will produce an output prediction. For example, a predictive algorithm will create a predictive model. Then, when the predictive model is provided with data, the ML model will output a prediction based on the data that trained the model and on the newly input data.

ML techniques may be used to improve the accuracy of predictive models. Depending on the nature of the business problem being addressed, there are different approaches based on the type and volume of the data. Supervised learning is one such approach. Supervised learning typically begins with an established set of data and a certain understanding of how that data is classified. Supervised learning is typically intended to find patterns in data that can be applied to an analytics process. This data has labeled features that define the meaning of data. For example, one can create a machine-learning application that distinguishes between millions of animals, based on images and written descriptions.

Unsupervised learning is another approach. Unsupervised learning is typically used when the problem requires a massive amount of unlabeled data. Understanding the meaning behind this data requires algorithms that classify the data based on the patterns or clusters it finds. Unsupervised learning conducts an iterative process, analyzing data without human intervention. It is often used with email spam-detecting technology, as there are typically far too many variables in legitimate and spam emails for an analyst to tag unsolicited bulk email. Instead, machine-learning classifiers, based on clustering and association, are applied to identify unwanted email.

A third approach is reinforcement learning. Reinforcement learning generally refers to a behavioral learning model. The algorithms receive feedback from the data analysis, guiding the user to the best outcome. Reinforcement learning differs from other types of supervised learning, because the system is not trained with the sample data set. Rather, the system learns through trial and error. Therefore, a sequence of successful decisions will result in the process being reinforced, because it best solves the problem at hand.

A fourth approach is deep learning. Deep learning generally refers to a specific method of machine learning that incorporates neural networks in successive layers to learn from data in an iterative manner. Deep learning is especially useful when trying to learn patterns from unstructured data. Deep learning complex neural networks are designed to emulate how the human brain works, so computers can be trained to deal with poorly defined abstractions and problems. Neural networks and deep learning are often used in image recognition, speech, and computer vision applications.

After the initial training is complete, ML models may be updated, retrained, and/or changed from time to time. In an illustrative update cycle, the new model may have a number of data science metrics that suggest it will perform better than the old model, such as improved accuracy, bias, or drift measurements. However, before pushing any new version of ML model into "production," most organizations would like to know how well the new model will actually perform at its intended purpose. Commonly, this actual performance is measured against a second set of performance indicators, referred to generally as key performance indicator(s) (KPI or KPIs). These KPIs can vary depending on the purpose for which the ML model was created and used, such as net profit, average sales per customer, employee retention, repeat customers, quality of customer experience measured by survey results, errors per unit of production, among others.

Accordingly, some embodiments provide a method and system to evaluate a new ML model before using it in production in the context of the business impact to reduce/eliminate the risk. Some embodiments may include a system that can generate artificial KPI values and calculate ML metrics on the recently logged scoring payload. Some embodiments may also compare the results produced by the old (i.e., currently deployed on production) ML model to the predicted performance of the new ML model.

Cloud Computing

FIG. 1 illustrates a cloud environment, consistent with some embodiments. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active customer accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited customer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
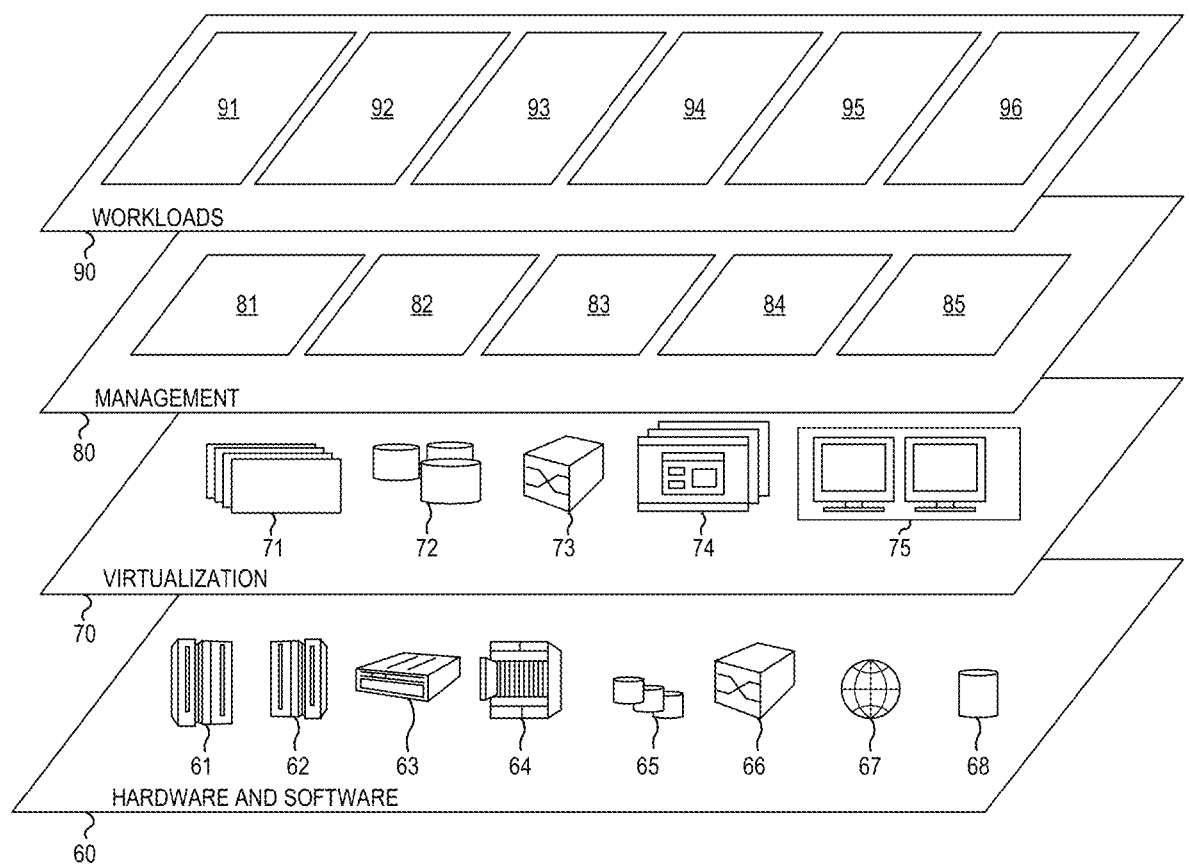
FIG. 2 depicts abstraction model layers, consistent with some embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. Customer portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a business application 96.

Data Processing System

Figure 3:
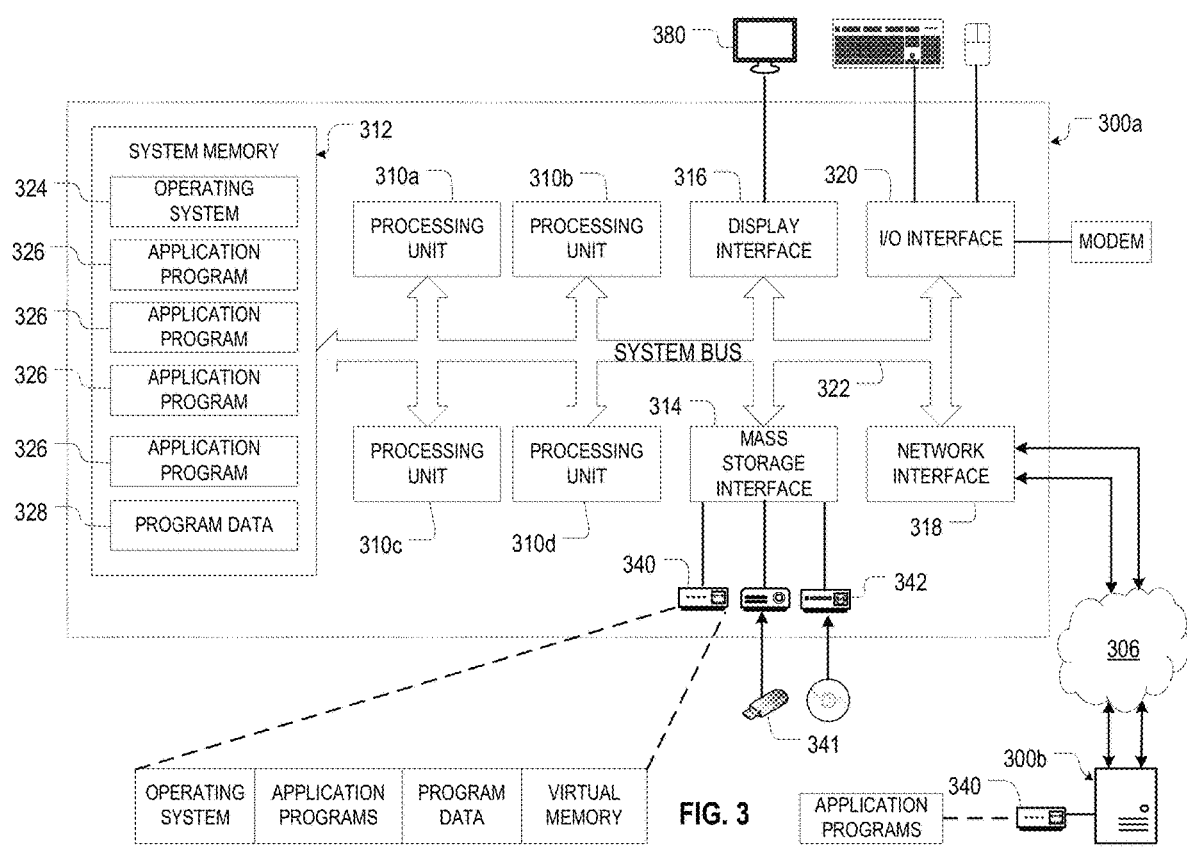
FIG. 3 depicts a data processing system, consistent with some embodiments.

FIG. 3 illustrates an embodiment of a data processing system (DPS) 300 suitable for use as a cloud computing node 10 in a cloud computing environment 50, consistent with some embodiments. In some embodiments, the DPS 300 may be implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 3 may be present, and that the number, type, and configuration of such components may vary. Moreover, FIG. 3 only depicts the representative major components of the DPS 300, and individual components may have greater complexity than represented in FIG. 3.

The data processing system 300 in FIG. 3 may include a plurality of central processing units 310 a-310 d (herein generically referred to as a processor 310 or a CPU 310) connected to a memory 312, a mass storage interface 314, a terminal/display interface 316, a network interface 318, and an input/output ("I/O") interface 320 by a system bus 322. The mass storage interface 314 in this embodiment connect the system bus 322 to one or more mass storage devices, such as a direct access storage device 340, universal serial bus ("USB") storage device 341, or a readable/writable optical disk drive 342. The network interfaces 318 may allow the DPS 300a to communicate with other DPS 300b over the communications medium 306. The memory 312 may also contain an operating system 324, a plurality of application programs 326, and program data 328.

The DPS 300 embodiment in FIG. 3 may be a general-purpose computing device. Accordingly, the processors 310 may be any device capable of executing program instructions stored in the memory 312 and may themselves be constructed from one or more microprocessors and/or integrated circuits. In this embodiment, the DPS 300 contains multiple processors and/or processing cores, as is typical of larger, more capable computer systems; however, in other embodiments the DPS 300 may comprise a single processor system and/or a single processor designed to emulate a multiprocessor system. Further, the processors 310 may be implemented using a number of heterogeneous DPS 300 in which a main processor is present with secondary processors on a single chip. As another illustrative example, the processor 310 may be a symmetric multi-processor system containing multiple processors of the same type.

When the DPS 300 starts up, the associated processor(s) 310 may initially execute the program instructions that make up the operating system 324, which manages the physical and logical resources of the DPS 300. These resources may include the memory 312, the mass storage interface 314, the terminal/display interface 316, the network interface 318, and the system bus 322. As with the processor(s) 310, some DPS 300 embodiments may utilize multiple system interfaces 314, 316, 318, 320, and busses 322, which in turn, may each include their own separate, fully programmed microprocessors.

Instructions for the operating system, applications and/or programs (generically referred to as "program code," "computer usable program code," or "computer readable program code") may be initially located in the mass storage devices 340, 341, 342, which are in communication with the processors 310 through the system bus 322. The program code in the different embodiments may be embodied on different physical or tangible computer readable media, such as the system memory 312 or the mass storage devices 340, 341, 342. In the illustrative example in FIG. 3, the instructions may be stored in a functional form of persistent storage on the direct access storage device 340. These instructions may then be loaded into the memory 312 for execution by the processor 310. However, the program code may also be located in a functional form on the computer readable media 342 that is selectively removable and may be loaded onto or transferred to the DPS 300 for execution by the processor 310.

The system bus 322 may be any device that facilitates communication between and among the processors 310; the memory 312; and the interfaces 314, 316, 318, 320. Moreover, although the system bus 322 in this embodiment is a relatively simple, single bus structure that provides a direct communication path among the system bus 322, other bus structures are consistent with the present disclosure, including without limitation, point-to-point links in hierarchical, star or web configurations, multiple hierarchical buses, parallel and redundant paths, etc.

The memory 312 and the mass storage devices 340, 341, 342 may work cooperatively to store the operating system 324, the application programs 326, and the program data 328. In the illustrated embodiment, the memory 312 is a random-access semiconductor device capable of storing data and programs. Although FIG. 3 conceptually depicts that device as a single monolithic entity, the memory 312 in some embodiments may be a more complex arrangement, such as a hierarchy of caches and other memory devices. For example, the memory 312 may exist in multiple levels of caches, and these caches may be further divided by function, so that one cache holds instructions while another holds non-instruction data, which is used by the processor or processors. Memory 312 may be further distributed and associated with different processors 310 or sets of processors 310, as is known in any of various so-called non-uniform memory access (NUMA) computer architectures. Moreover, some embodiments may utilize virtual addressing mechanisms that allow the DPS 300 to behave as if it has access to a large, single storage entity instead of access to multiple, smaller storage entities such as the memory 312 and the mass storage device 340, 341, 342.

Although the operating system 324, the application programs 326, and the program data 328 are illustrated as being contained within the memory 312, some or all of them may be physically located on different computer systems and may be accessed remotely, e.g., via the communication medium 306, in some embodiments. Thus, while the operating system 324, the application programs 326, and the program data 328 are illustrated as being contained within the memory 312, these elements are not necessarily all completely contained in the same physical device at the same time and may even reside in the virtual memory of other DPS 300.

The system interfaces 314, 316, 318, 320 support communication with a variety of storage and I/O devices. The mass storage interface 314 may support the attachment of one or more mass storage devices 340, 341, 342, which are typically rotating magnetic disk drive storage devices, a solid-state storage device (SSD) that uses integrated circuit assemblies as memory to store data persistently, typically using flash memory, or a combination of the two. However, the mass storage devices 340, 341, 342 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 316 may be used to directly connect one or more display units, such as monitor 380, to the DPS 300. These display units 380 may be non-intelligent (i.e., dumb) terminals, such as an LED monitor, or may themselves be fully programmable workstations used to allow IT administrators and customers to communicate with the DPS 300. Note, however, that while the display interface 316 is provided to support communication with one or more display units 380, the DPS 300 does not necessarily require a display unit 380 because all needed interaction with customers and other processes may occur via network interface 318.

The communications medium 306 may be any suitable network or combination of networks and may support any appropriate protocol suitable for communication of data and/or code to/from multiple DPS 300. Accordingly, the network interfaces 318 can be any device that facilitates such communication, regardless of whether the network connection is made using present day analog and/or digital techniques or via some networking mechanism of the future. Suitable communication media 306 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols can be used to implement the communications medium 306. The Transmission Control Protocol/Internet Protocol ("TCP/IP") suite contains suitable network and transport protocols.

Model Training

The ML models in some embodiments may be any software system that enables a system to learn from data rather than through explicit programming. One example of a ML model that will be used for illustrative purposes is a feedforward neural network, a type of deep learning model.

In some embodiments, the ML models may comprise a plurality of artificial neurons interconnected through connection points called synapses. Each synapse may encode a strength of the connection between the output of one neuron and the input of another. The output of each neuron, in turn, may be determined by the aggregate input received from other neurons that are connected to it, and thus by the outputs of these "upstream" connected neurons and the strength of the connections as determined by the synaptic weights.

The ML models may be trained to solve a specific problem (e.g., speech recognition) by adjusting the weights of the synapses such that a particular class of inputs produce a desired output. This weight adjustment procedure in these embodiments is known as "learning." Ideally, these adjustments lead to a pattern of synaptic weights that, during the learning process, converge toward an optimal solution for the given problem based on some cost function. In some embodiments, the artificial neurons may be organized into layers. The layer that receives external data is the input layer. The layer that produces the ultimate result is the output layer. Same embodiments may include hidden layers between the input and output layers, and commonly include dozens or hundreds of such hidden layers.

Figure 4:
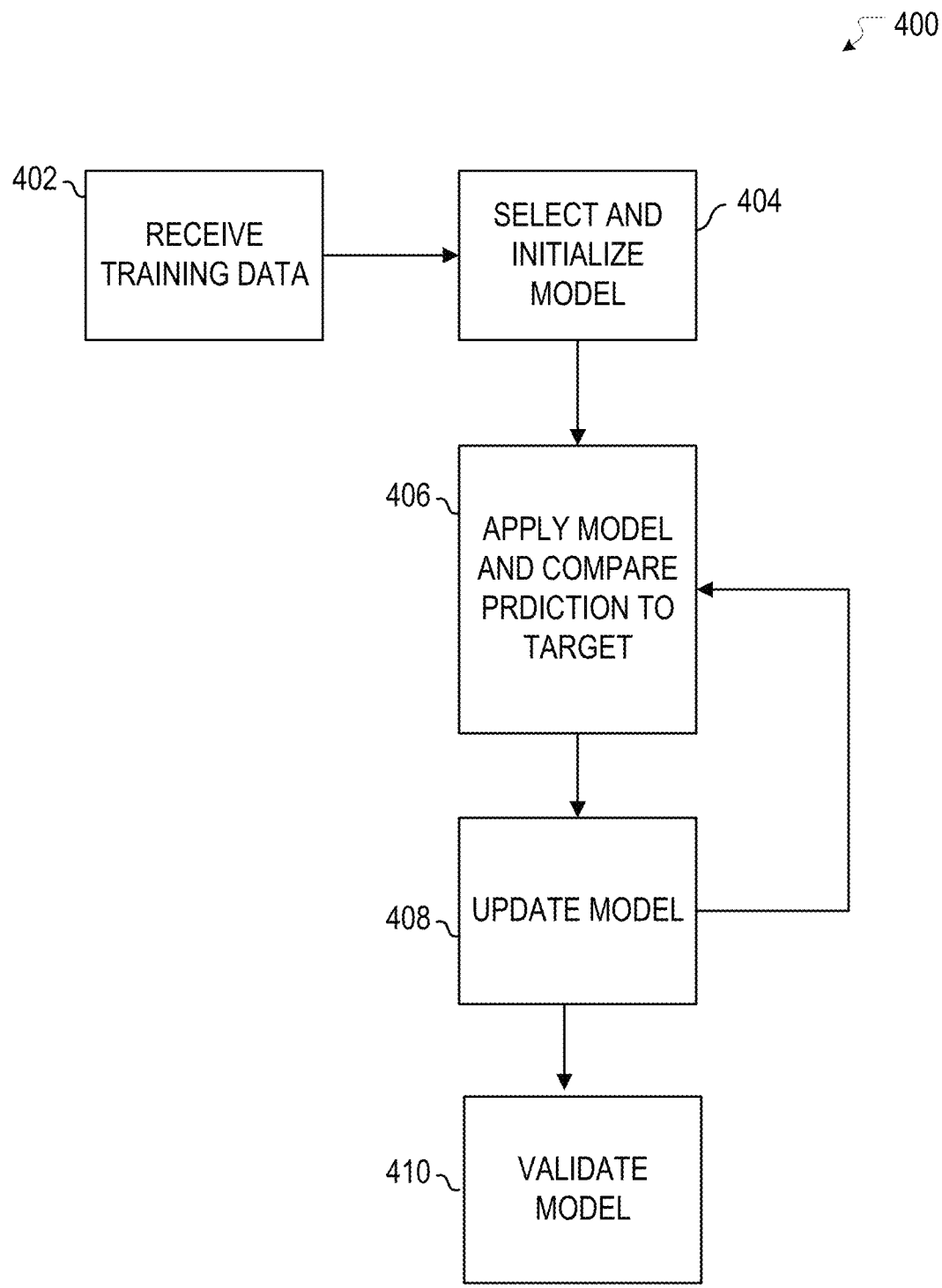
FIG. 4 illustrates one ML training method that may be applicable to some of the embodiments described herein.

FIG. 4 illustrates one ML training method 400 that may be applicable to some of the embodiments described herein, described with reference to speech recognition as an illustrative example. At operation 402, the DPS 300 may receive training data. In one illustrative example, or use case, the input data set may include recorded television audio and the target data set may include manually-transcribed close caption data. Also at operation 402, the training data may be prepared to reduce sources of bias, typically including de-duplication, normalization, and order randomization. At operation 404, a model may be chosen for training and the initial synaptic weights are randomized. Depending on the underlying task, suitable models that may be chosen include, but are not limited to, feedforward techniques (e.g., convolutional neural networks), regulatory feedback-based systems, radial basis function (RBF) techniques, and recurrent neural network-based techniques (e.g., long short-term memory). At operation 406, the selected model may be used to predict an output using the input data element, and that prediction is compared to the corresponding target data. The gradient (e.g., difference between the predicted value and the target value) may then be used at operation 408 to update the model, more specifically by updating the synaptic weights. This process may repeat, with each iteration updating the weights, until the training data is exhausted, or the model reaches an acceptable level of accuracy and/or precision. At operation 410, the resulting model may optionally be compared to previously unevaluated data to validate and test its performance.

Regression Model

Figure 5:
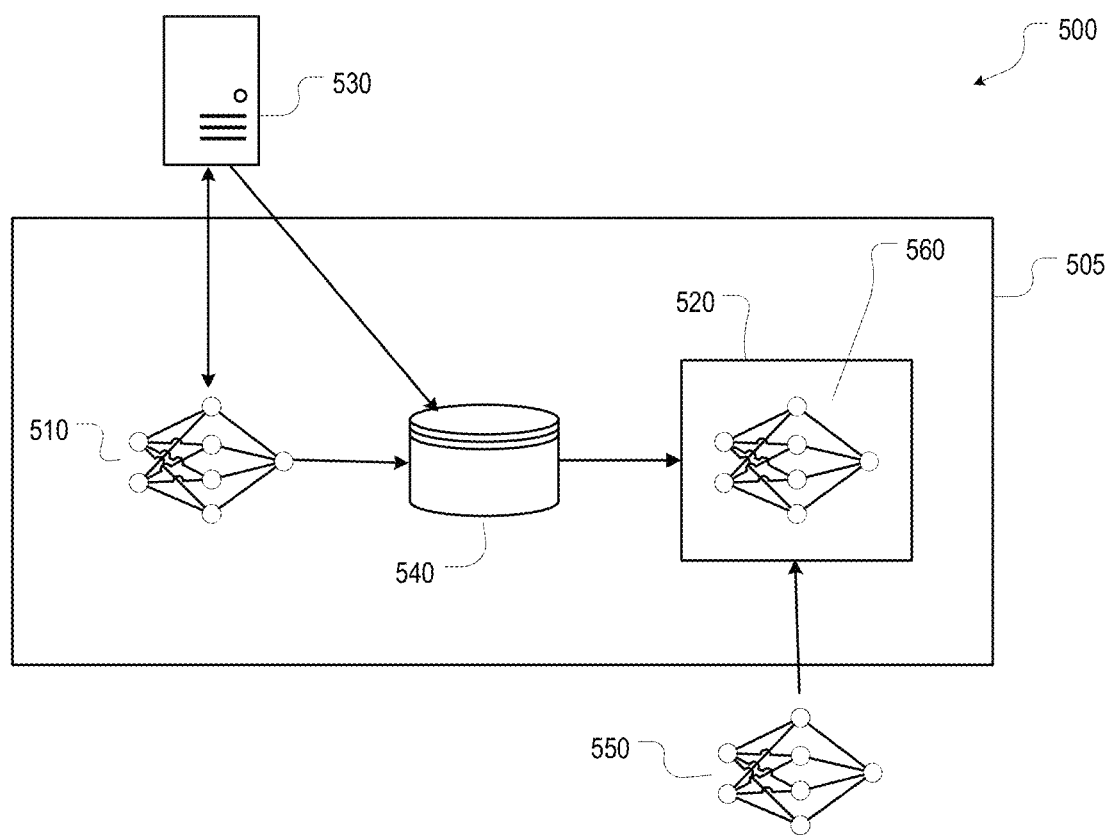
FIG. 5 illustrates an illustrative business application, consistent with some embodiments.

FIG. 5 illustrates an illustrative business application 500, consistent with some embodiments and suitable for use as business application 96. The business application 500 in this example may include a recommendation engine 505 (which may be implemented using one or more DPS 300) implementing an original ML model 510 and a forecasting engine 520. The original ML model 510 may interact with a plurality of customers (not shown) over a web server DPS 530 to collect performance data. The performance data may be stored in a database 540 and used to calculate performance statistics for the original ML model 510. The forecasting engine 520 may receive a proposed adjustment 550 to the original machine learning model and then calculate, using a regression machine learning model 560, a set of value components for a plurality of key performance indicators. The forecasting engine 520 may then calculate a plurality of results for the plurality of key performance indicators, using the set of value components, and then automatically determine whether the plurality of results exceeds the performance data for the original machine learning model. The forecasting engine 520 in some embodiments may output a recommendation about whether or not to modify and/or replace the original ML model 510 with the proposed adjustment 550 based on the determining. In other embodiments, the forecasting engine 520 may automatically deploy the proposed adjustment 550 (e.g., modify and/or replace the original ML model 510) based on the determining.

Figure 6:
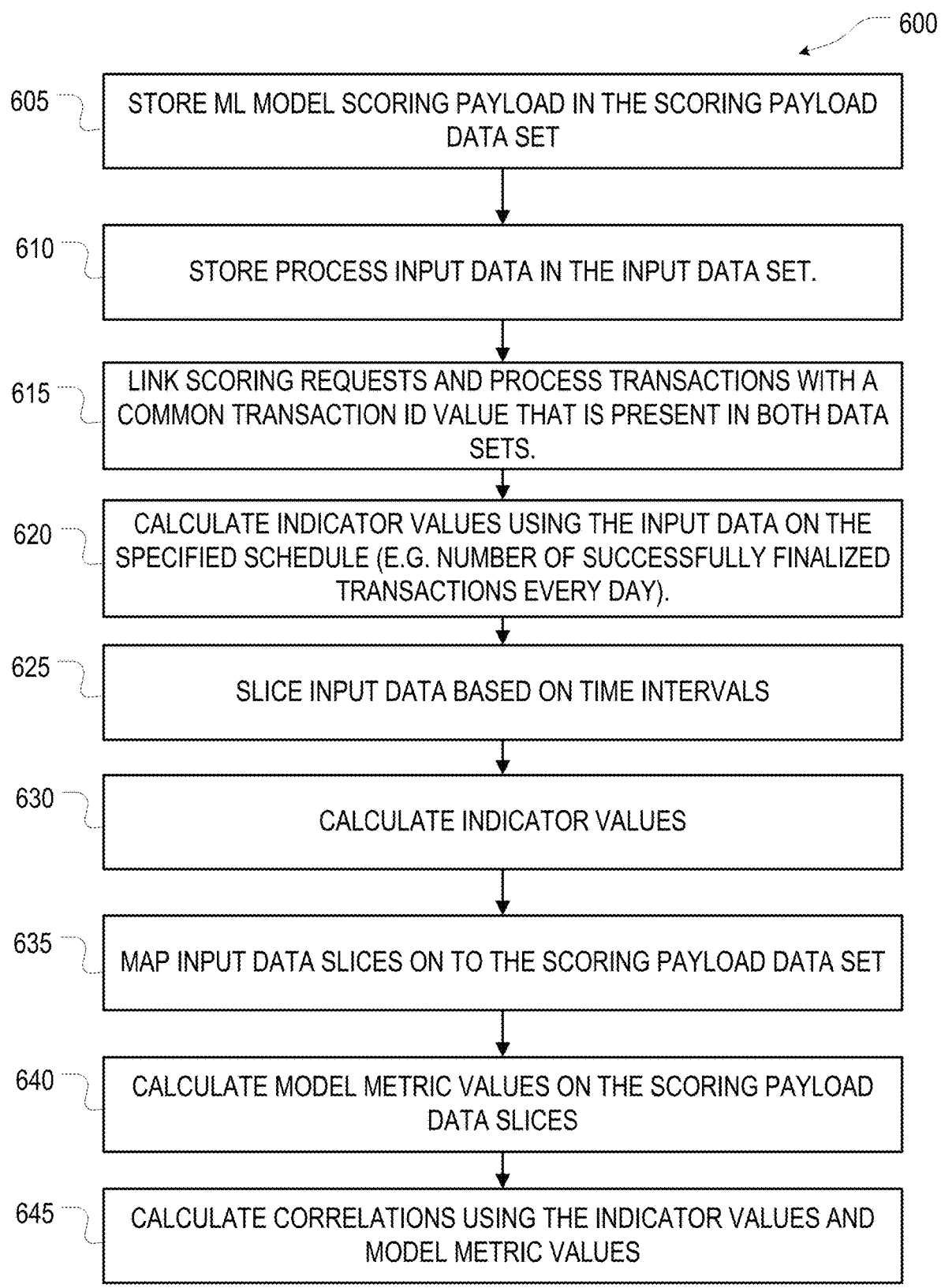
FIG. 6 is a flow chart illustrating one method of training a regression model that can predict the performance of a new ML model, consistent with some embodiments.

FIG. 6 is a flow chart illustrating one method 600 of training a regression model that can predict the performance of a new ML model, consistent with some embodiments. The method 600 in this embodiment starts with an assumption that the formula used to calculate a performance indicator value (e.g., KPI) from its components (e.g., a series of values per each input data record/transaction) is known. For example, the formula could be an aggregation function over a time interval of some measured value.

The performance prediction between machine learning model metric values and overall process indicator values (such as business KPIs) in some embodiments can be described in the following operations. At operation 605, the ML model scoring payload may be stored in run-time in the scoring payload data set. At operation 610, the process input data may be stored in run-time in the input data set. At operation 615, scoring requests and process transactions may be linked with a common transaction ID value that is present in both data sets.

Next, at operation 620, the indicator values may be calculated using the input data on the specified schedule (e.g., number of successfully finalized transactions every day). The input data may then be sliced based on time intervals at operation 625, which may be used to calculate the indicator values at operation 630. At operation 635, the input data slices may then be mapped on to the scoring payload data set, which may allow for identification corresponding scoring payload data slices. The model metric values may then be calculated on the scoring payload data slices at operation 640, and the indicator values and model metric values may be used to calculate correlations at operation 645. As a result of this method 600, some embodiments may have an initial correlation between model metric values and indicator values.

KPI Prediction

Figure 7:
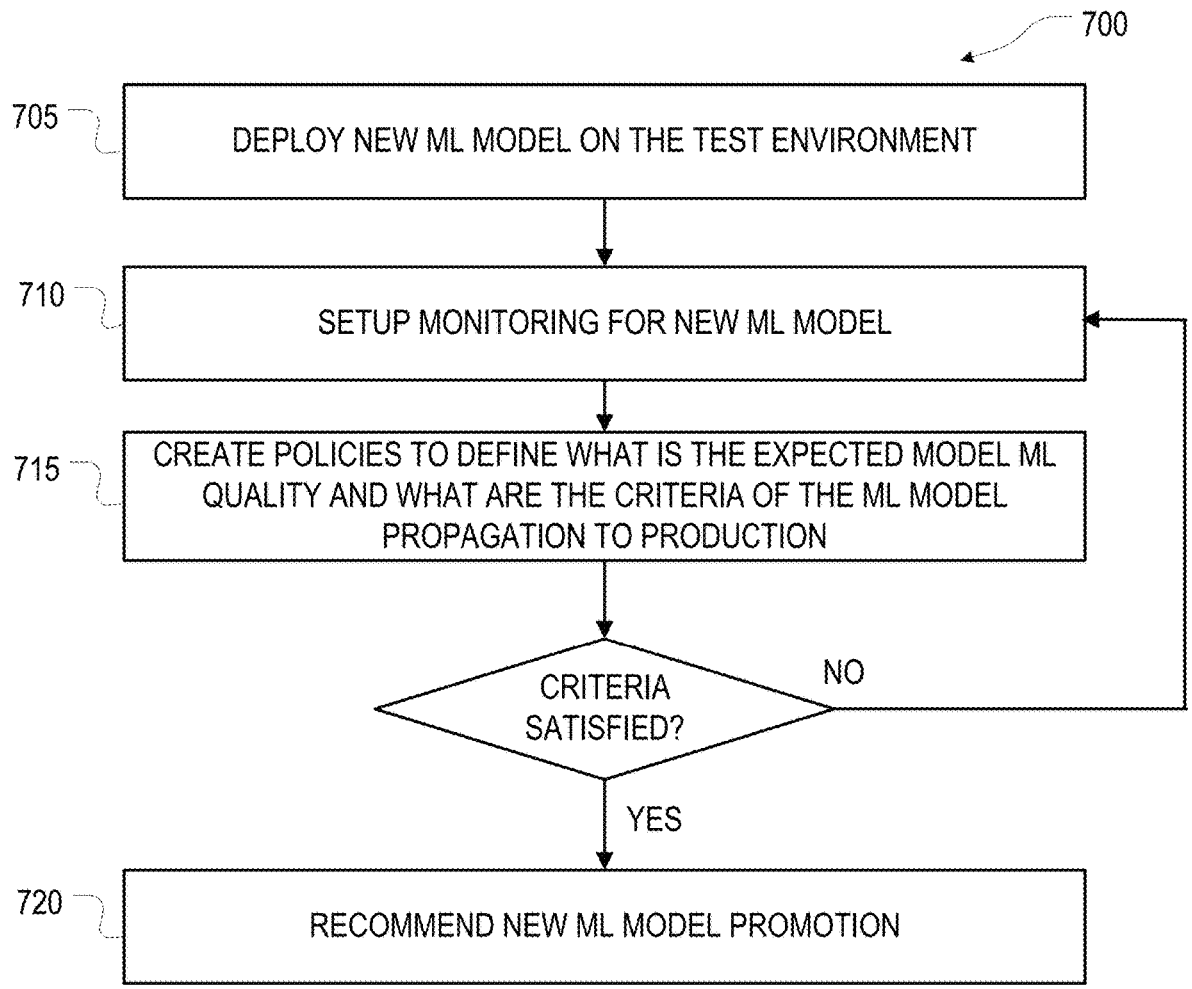
FIG. 7 is a flow chart illustrating one method of using a regression model to predict the performance of a new ML model, consistent with some embodiments.

Assuming the business payload data is not sent to the forecasting engine 520 (shown in FIG. 5) in real-time, it may be desirable to predict the indicator values based on the scoring payload real-time data. FIG. 7 is a flow chart illustrating one such method 700, consistent with some embodiments.

To achieve this goal, some embodiments may train a regression model that will take as an input the scoring payload data, including: a feature vector; prediction results of the monitored model; and probability of the prediction of the monitored model. The regression model may then predict the indicator value component. The real value (i.e., for training purposes) may be available in the input data, which can be easily joined with the scoring payload. Table 1 is a JSON-formatted illustrative example of a scoring payload record. In this illustrative example, "Fields" are representing names of columns, and the "values" have sample values for those fields. "Probability" contains probability of prediction. "Prediction" is an indexed prediction. "PredictedLabel" is an encoded (string) prediction. This data is used as part of feature vector for a regression model.

TABLE 1

[
  {
    "scoring_id":"42e62c3ae2244f0d851009dec4754d74",
    "request":{
      "fields":[
        "CheckingStatus",
        "LoanDuration",
        "CreditHistory",
        "LoanPurpose",
        "LoanAmount",
        "ExistingSavings",
        "EmploymentDuration",
        "InstallmentPercent",
        "Sex",
        "OthersOnLoan",
        "CurrentResidenceDuration",
        "OwnsProperty",
        "Age",
        "InstallmentPlans",
        "Housing",
        "ExistingCreditsCount",
        "Job",
        "Dependents",
        "Telephone",
        "PermanentResident"
      ], TABLE 1-continued "values":[
        [
          "less_0",
          4,
          "all_credits_paid_back",
          "car_new",
          250,
          "less_100",
          "less_1",
          2,
          "male",
          "none",
          1,
          "real_estate",
          26,
          "stores",
          "rent",
          1,
          "unskilled",
          1,
          "none",
          "yes"
        ]
      ],
      "meta":{
        "fields":[
          "transaction_id"
        ],
        "values":[
          [
            "0-0-0"
          ]
        ]
      }
    },
    "response":{
      "fields":[
        "CheckingStatus",
        "LoanDuration",
        "CreditHistory",
        "LoanPurpose",
        "LoanAmount",
        "ExistingSavings",
        "EmploymentDuration",
        "InstallmentPercent",
        "Sex",
        "OthersOnLoan",
        "CurrentResidenceDuration",
        "OwnsProperty",
        "Age",
        "InstallmentPlans",
        "Housing",
        "ExistingCreditsCount",
        "Job",
        "Dependents",
        "Telephone",
        "PermanentResident",
        "CheckingStatus_IX",
        "CreditHistory_IX",
        "EmploymentDuration_IX",
        "ExistingSavings_IX",
        "PermanentResident_IX",
        "Housing_IX",
        "InstallmentPlans_IX",
        "Job_IX",
        "LoanPurpose_IX",
        "OthersOnLoan_IX",
        "OwnsProperty_IX",
        "Sex_IX",
        "Telephone_IX",
        "features",
        "rawPrediction",
        "probability",
        "prediction",
        "predictedLabel"
      ], TABLE 1-continued

```
"values":[
  [
    "less_0",
    4,
    "all_credits_paid_back",
    "car_new",
    250,
    "less_100",
    "less_1",
    2,
    "male",
    "none",
    1,
    "real_estate",
    26,
    "stores",
    "rent",
    1,
    "unskilled",
    1,
    "none",
    "yes",
    1.0,
    3.0,
    3.0,
    0.0,
    0.0,
    1.0,
    1.0,
    1.0,
    0.0,
    0.0,
    2.0,
    0.0,
    0.0,
    [
      1.0,
      3.0,
      0.0,
      0.0,
      3.0,
      0.0,
      0.0,
      2.0,
      1.0,
      1.0,
      1.0,
      0.0,
      0.0,
      4.0,
      250.0,
      2.0,
      1.0,
      4.0,
      26.0,
      1.0,
      1.0
    ],
    [
      19.600662549552556,
      0.39933745044744245
    ],
    [
      0.8996331274776279,
      0.10036687252237211
    ],
    0.0,
    "No Risk"
  ]
  ]
},
"response_time":460
}
```

In addition, some embodiments may have a "transaction_id" that can be used to join this data with business payload data. Table 2 is a JSON-formatted illustrative example of business payload data:

TABLE 2

```
"LoanDuration",
"LoanPurpose",
"LoanAmount",
"InstallmentPercent",
"AcceptedPercent",
"Accepted",
"AmountGranted",
"transaction_id",
timestamp
4,
"car_new",
250,
2,
0.9800331274776278,
1,
250,
0-0-0,
2019-08-29T00:47:18.927875Z
33,
"appliances",
4177,
4,
0.4911971758888131,
0,
0,
0-0-1,
2019-08-29T00:47:18.927915Z
27,
"business",
6794,
3,
0.47378699706907845,
0,
0,
0-0-2,
2019-08-29T00:47:18.927937Z
17,
"car_new",
4252,
2,
0.8114243344334747,
1,
4252,
0-0-3,
2019-08-29T00:47:18.927956Z
4,
"car_used",
250,
2,
0.9842413066763195,
1,
250,
0-0-4,
2019-08-29T00:47:18.927975Z
```

After the join, the indictor value in this illustrative example may be calculated (e.g., as SUM(AMOUNT_GRANTED) per day).

In some embodiments, the indicator value may be used as a TARGET for the regression model. For example, the regression model may take a feature vector from the scoring payload (Table 1) and the indicator value calculated for the business payload (Table 2) connected to the scoring payload.

Next, having trained such a regression model, some embodiments may, in real-time when the scoring payload is logged, predict the indicator value components for the selected data slice (e.g., time interval) and then calculate the final prediction of the indicator value using the known formula. The predicted indicator values may then be used to warn the user about possible value drops.

Once the input data is logged, the input data could be used to evaluate and retrain the regression model. Table 3 below contains example input and scoring payload for one illustrative ML model, as well as real-time scoring data and predicted indicator values:

TABLE 3

| | Historical Input Payload | | | Historical Scoring Payload | | | | |
|---|---|---|---|---|---|---|---|---|
| Input Feature A | Input Feature B | Indicator Value Component | Indicator Value (SUM) | Scoring Feature A | Scoring Feature B | Scoring Feature C | Prediction | Probability |
| 1 | 2 | 1 | | 2 | 1 | 0 | 1 | 0.9 |
| 2 | 1 | 2 | | 3 | 2 | 1 | 1 | 0.87 |
| 3 | 2 | 1 | 4 | 2 | 2 | 1 | 0 | 0.78 |
| 1 | 1 | 3 | | 1 | 1 | 0 | 0 | 0.89 |
| 2 | 3 | 2 | | 2 | 1 | 0 | 1 | 0.77 |
| 3 | 3 | 2 | 7 | 3 | 2 | 1 | 0 | 0.67 |
| | | Predicted Indicator Value Components | Predicted Indicator Value | Real time Scoring Payload | | | | |
| | | 2 | | 3 | 2 | 0 | 1 | 0.86 |
| | | 1 | | 2 | 2 | 0 | 0 | 0.92 |
| | | 3 | 6 | 1 | 1 | 1 | 0 | 0.76 |
| | | 2 | | 2 | 1 | 1 | 1 | 0.69 |
| | | 1 | | 3 | 2 | 1 | 0 | 0.83 |
| | | 1 | 4 | 2 | 2 | 1 | 0 | 0.89 |

In the example in Table 3, all inputs plus scoring output equal the feature vector. The indicator value equals the target column/field for this regression model. The model learns on it, and next predicts new indicator value for new scoring payload (i.e., input+output from the model).

Finally, the predicted indicator values may be used in some embodiments to automatically determine whether the new ML model quality is sufficient (e.g., better KPI than the old ML model) for it to be moved to a production environment. The overall ML model management process in some embodiments may include the following operations: at operation 705, the initial, new ML model is deployed on the test environment. At operation 710, monitoring may be setup for the new ML model, which includes the indicator value prediction system. At operation 715, policies may be created to define what is the expected model ML quality and what are the criteria of the ML model propagation to production (e.g., no diminution in indicator value or a specified threshold value has to be maintained). At operation 720, when criteria are met, the new ML model promotion can be recommended to the user.

Computer Program Product

Although the present invention has been described in detail with reference to certain examples thereof, it may be also embodied in other specific forms without departing from the essential spirit or attributes thereof. For example, the present invention may be a system, a method, and/or a computer program product at any possible technical detail level of integration. The computer program product may include a computer readable storage medium (or media) having computer readable program instructions thereon for causing a processor to carry out aspects of the present invention. The computer readable program instructions can be stored and executed on a single computer or divided amongst different computers, at the same location or different locations, for storage and execution.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the customer's computer, partly on the customer's computer, as a stand-alone software package, partly on the customer's computer and partly on a remote computer or entirely on the remote computer or server. In the latter scenario, the remote computer may be connected to the customer's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

GENERAL

Aspects of the present invention were described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. Moreover, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. A computer-implemented method for predicting an impact of an adjustment to a machine learning model to key performance indicators, the method comprising:
   receiving a proposed adjustment to a machine learning model;
   calculating, using a regression machine learning model to ingest the proposed adjustment, a set of value components for a key performance indicator (KPI) as indicator values using input data on a specified schedule;
   mapping the calculated indicator values onto scoring payload data;
   calculating a plurality of results for the KPI using the set of value components;
   automatically determining whether the plurality of results exceeds a performance threshold;
   recommending the proposed adjustment based on the determination; and
   training the regression model by iteratively performing:
      receiving a model scoring payload, an input data set, and a target data set;
      calculating a gradient that is a difference between an input data value of the input data set and a target data value of the target data set; and
      propagating the gradient through layers of the regression model to update synaptic weights of the regression model.

2. The computer-implemented method of claim 1, further comprising analyzing a set of machine learning model metrics against a plurality of key performance indicators (KPIs).

3. The computer-implemented method of claim 1, further comprising calculating metric values for the proposed adjustment using model scoring payload data slices.

4. The computer-implemented method of claim 1, wherein determining whether the plurality of results exceeds the performance threshold comprises:
   deploying the proposed adjustment in a test environment;
   defining an expected model quality parameter; and
   monitoring the proposed adjustment in the test environment to produce test data; and recommending the proposed adjustment to a user when the test data exceeds the expected model quality parameter.

5. The computer-implemented method of claim 4, further comprising approving the proposed adjustment based on the recommendation.

6. A computer program product for predicting an impact of an adjustment to a machine learning model to key performance indicators, the computer program product comprising a computer readable storage medium having program instructions embodied therewith, the program instructions executable by a processor to cause the processor to:
   receive a proposed new version of a machine learning model;
   calculate, using a regression machine learning model to ingest the proposed new version, a set of value components for a plurality of key performance indicators as indicator values using input data on a specified schedule;
   mapping the calculated indicator values onto scoring payload data;
   calculate a plurality of results for the plurality of key performance indicators, using the set of value components;
   automatically determine whether the plurality of results exceeds a performance threshold;
   recommend the proposed adjustment based on the determination; and
   train the regression model by the instructions causing the processor to iteratively perform operations to:
      receive a model scoring payload, an input data set, and a target data set;
      calculate a gradient that is a difference between an input data value of the input data set and a target data value of the target data set; and
      propagate the gradient through layers of the regression model to update synaptic weights of the regression model.

7. The computer program product of claim 6, further comprising program instructions to analyze a set of machine learning model metrics against the plurality of key performance indicators.

8. The computer program product of claim 6, further comprising program instructions to calculate metric values for the proposed new version using model scoring payload data slices.

9. The computer program product of claim 6, wherein determining whether the plurality of results exceeds the performance threshold comprises:
   deploying the proposed new version in a test environment;
   defining an expected model quality parameter; and
   monitoring the proposed new version in the test environment to produce test data; and
   recommending the proposed new version to a user when the test data exceeds the expected model quality parameter.

10. A forecasting engine for a machine learning model, comprising:
   one or more processors coupled to one or more memories, the one or more memories comprising:
      an original machine learning model having performance statistics associated therewith;
      performance data for the original machine learning model; and
      program instructions that, when executed on the one or more processors, cause the one or more processors to:
         receive a proposed adjustment to the original machine learning model;
         calculate, using a regression machine learning model to ingest the proposed new version, a set of value components for a plurality of key performance indicators as indicator values using input data on a specified schedule;
         mapping the calculated indicator values onto scoring payload data;
         calculate a plurality of results for the plurality of key performance indicators, using the set of value components;
         automatically determine whether the plurality of results exceeds a performance threshold;
         recommend the proposed adjustment based on the determination; and
         train the regression model by the instructions causing the processor to iteratively perform operations to:
            receive a model scoring payload, an input data set, and a target data set;
            calculate a gradient that is a difference between an input data value of the input data set and a target data value of the target data set; and
            propagate the gradient through layers of the regression model to update synaptic weights of the regression model.

11. The forecasting engine of claim 10, further comprising program instructions executable by a processor to cause the processor to analyze a set of machine learning model metrics against a plurality of key performance indicators.

12. The forecasting engine of claim 10, further comprising program instructions to calculate metric values for the proposed adjustment using model scoring payload data slices.

13. The forecasting engine of claim 10, further comprising program instructions to automatically deploy the proposed adjustment based on the determining.

* * * * *